3,207,786
2-(o-HALOBENZYLOXY)FORMANILIDES
Harry Louis Yale, New Brunswick, Francis Alexander Sowinski, Edison, and Jack Bernstein, New Brunswick, N.J., assignors to Olin Mathieson Chemical Corporation, New York, N.Y., a corporation of Virginia
No Drawing. Application Mar. 12, 1962, Ser. No. 186,570, now Patent No. 3,133,936, dated May 19, 1964, which is a division of application Ser. No. 90,225, Feb. 20, 1961, now Patent No. 3,069,432, dated Dec. 18, 1962. Divided and this application July 29, 1963, Ser. No. 303,638
2 Claims. (Cl. 260—562)

This application is a division of our application Serial No. 186,570, filed March 12, 1962, and now Patent No. 3,133,936, granted May 19, 1964, which in turn is a division of our application Serial No. 90,225, filed February 20, 1961, and now Patent No. 3,069,432, granted December 18, 1962.

This invention relates to new basically substituted dihydrodibenzoxazepines (and their salts) having valuable therapeutic properties, processes for the preparation thereof, and new intermediates useful in such processes.

The therapeutically active compounds of this invention include dihydrodibenzoxazepines of the general formula (I):

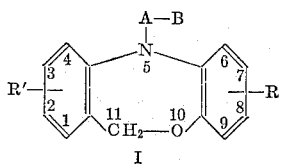

wherein A is a lower alkylene radical of at least two carbon atoms, B is a basic saturated nitrogen-containing radical of less than twelve carbon atoms, and R and R' are the same or different and represent hydrogen, halogen, lower alkyl, lower alkoxy, trifluoromethyl, trifluoromethylmercapto, trifluoromethoxy or N,N-dimethylaminosulfonyl. Among the suitable radicals represented by the symbol B are: amino; (lower alkyl)amino; di(lower alkyl)amino; (hydroxy-lower alkyl)amino; di(hydroxy-lower alkyl)amino; and basic saturated 5 to 6 membered N-heterocyclic radicals of less than twelve carbon atoms, as exemplified by piperidyl [i.e., piperidino, 2-piperidyl, 3-piperidyl and 4-piperidyl]; (lower alkyl)piperidyl [e.g., 2, 3, or 4-(lower alkyl) piperidino or 2, 3 or 4-(N-lower alkyl)piperidyl); di(lower alkyl)piperidyl [e.g., 2,4- 2,5- or 3,5-di(lower alkyl)-piperidino, or 2, 3, or 4-(N-lower alkyl-2, 3, or 4-(lower alkyl)piperidyl]; (lower alkoxy) piperidyl; pyrrolidyl; (lower alkyl)pyrrolidyl; di(lower alkyl)pyrrolidyl; (lower alkoxy)pyrrolidyl; morpholinyl [i.e., morpholino, 2-morpholinyl and 3- morpholinyl]; (lower alkyl)morpholinyl; di(lower alkyl)morpholinyl; (lower alkoxy)morpholinyl; thiamorpholinyl; (lower alkyl)thiamorpholinyl; di(lower alkyl)thiamorpholinyl; (lower alkoxy)thiamorpholinyl; piperazyl; (lower alkyl) piperazyl (e.g., $N^4$-methylpiperazino); di(lower alkyl) piperazyl; (lower alkoxy)piperazyl; (hydroxy-lower alkyl)-piperazyl [e.g., $N^4$-(2-hydroxyethyl)piperazino]; (lower alkanoyloxy-alkyl)piperazyl [e.g., $N^4$-(2-acetoxyethyl)piperazino]; (hydroxy-lower alkoxy-lower alkyl) piperazyl [e.g., $N^4$-(2-hydroxyethoxyethyl)-piperazino]; and (carbo-lower alkoxy)piperazyl [e.g., $N^4$-(2-carbomethoxy, carboethoxy, or carbopropoxy)-piperazino]. The terms "lower alkyl," "lower alkoxy," and "lower alkylene," as employed herein, include both straight and branched chain radicals of less than eight carbon atoms. The particularly preferred compounds are those wherein A is a lower alkylene radical of two to three carbon atoms (i.e., ethylene, trimethylene-1,3 and propylene-1,2); B represents a di(lower alkyl)amino radical, an $N^4$-(lower alkyl)piperazino radical, an $N^4$-(2-hydroxyethyl)piperazino radical, or an $N^4$-(2-acetoxyethyl)piperazino radical, and R and R' are hydrogen.

As to salts of the dihydrodibenzoxazepines, those coming within the purview of this invention include the acid-addition salts, particularly, the non-toxic acid-addition salts. Acids useful for preparing the acid-addition salts, include, inter alia, inorganic acids, such as the hydrohalic acids (e.g., hydrochloric and hydrobromic acid), sulfuric acid, nitric acid and phosphoric acid, and organic acids, such as oxalic, maleic, tartaric, citric, acetic and succinic acid.

The compounds of this invention are therapeutically active compounds which are utilizable both as ataractic agents, and thus may be used in the treatment of depressed psychotic states, and as antihistamines. For these purposes they may be administered orally or parenterally in conventional dosage forms such as tablets, capsules, injectables or the like by incorporating the appropriate dose of the compound with carriers according to accepted pharmaceutical practice.

The compounds of this invention are prepared by a series of reactions as shown by the following equations, wherein R, R', A and B are as hereinbefore defined; and X' is chloro or bromo:

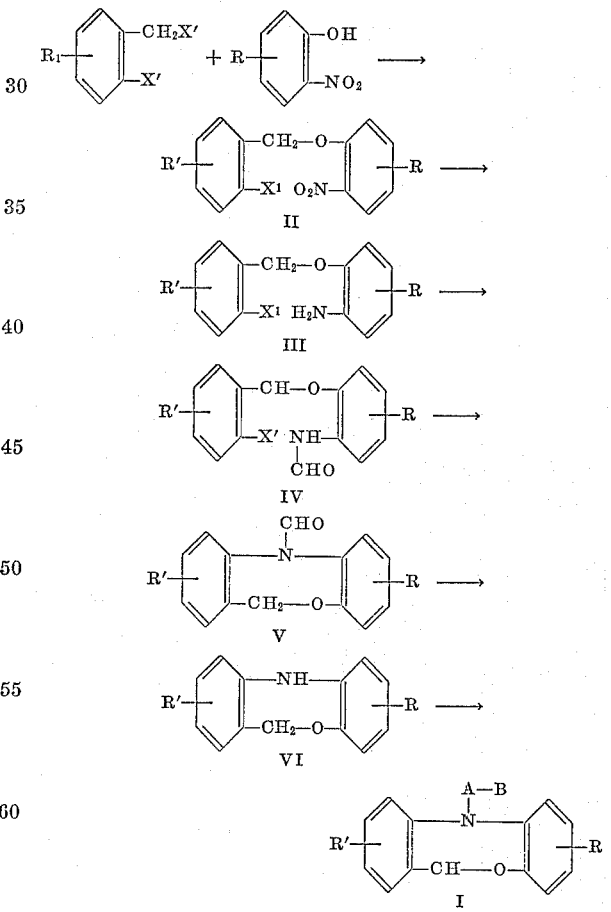

Among the suitable o-halobenzyl halides utilizable as initial reagents in these reactions may be mentioned: o-halobenzyl halides, such as o-bromobenzyl bromide, o-chlorobenzyl chloride and o-bromobenzyl chloride; halo-o-halobenzyl halides, such as 2,5-dibromobenzyl bromide, 2,4-dibromobenzyl bromide, 2-bromo-5-fluorobenzyl chloride, 2-bromo-5-chlorobenzyl chloride, and 2-bromo-4-fluorobenzyl chloride; (lower alkyl)-o-halobenzyl halides, such as 5-(lower alkyl)-2-halobenzyl halides (e.g., 5-methyl-2-bromobenzyl chloride, 5-ethyl-2-bromobenzyl bromide, 5-n-propyl-2-bromobenzyl bromide and 5-n-hexyl-2-chlorobenzyl chloride) and 4-(lower alkyl)-2-halobenzyl halides; (lower alkoxy)-o-halobenzyl halides, such as 5-(lower alkoxy)-2-halobenzyl halides (e.g., 5-methoxy-2-bromobenzyl bromide, 5-ethoxy-2-bromobenzyl chloride, 5-n-propoxy-2-bromobenzyl chloride and 5-n-hexyloxy-2-chlorobenzyl chloride); (trifluoromethyl)-o-halobenzyl halides, such as 5-(trifluoromethyl)-2-bromobenzyl chloride and 4-(trifluoromethyl)-2-bromobenzyl bromide; (trifluoromethylmercapto)-o-halobenzyl halides, such as 5-(trifluoromethylmercapto)-2-bromobenzyl chloride and 4-(trifluoromethylmercapto)-2-bromobenzyl bromide; (trifluoromethoxy)-o-halobenzyl halides, such as 5 - (trifluoromethoxy) - 2 - bromobenzyl chloride and 4-(trifluoromethoxy)-2-bromobenzyl bromide; and (N,N - dimethylsulfonamido) - o - halobenzyl halides, such as 5-(N,N-dimethylsulfonamido)-2-bromobenzyl chloride and 4 - (N,N-dimethylsulfonamido) - 2 - bromobenzyl bromide.

Among the suitable o-nitrophenols utilizable as initial reagents in these reactions may be mentioned: o-nitrophenol; halo-o-nitrophenols, such as 5-chloro-2-nitrophenol, 4-chloro-2-nitrophenol, 5-fluoro-2-nitrophenol, 4-fluoro-2-nitrophenol, and 5-bromo-2-nitrophenol; (lower alkyl)-o-nitrophenols, such as 5-(lower alkyl)-2-nitrophenols (e.g., 5-methyl-2-nitrophenol, 5-ethyl - 2 - nitrophenol, 5-n-propyl-2-nitrophenol and 5-n-hexyl-2-nitrophenol) and 4 - (lower alkyl) - 2 - nitrophenols; (lower alkoxy)-o-nitrophenols, such as 5-(lower alkoxy)-2-nitrophenols (e.g., 5-methoxy-2-nitrophenol, 5-ethoxy-2-nitrophenol, 5-n-propoxy-2-nitrophenol and 5-n-hexyloxy-2-nitrophenol) and 4-(lower alkoxy)-2-nitrophenols; trifluoromethyl-o-nitrophenols, such as 5-trifluoromethyl-2-nitrophenol and 4-trifluoromethyl-2-nitrophenol; trifluoromethoxy-o-nitrophenols, such as 5-trifluoromethoxy-2-nitrophenol; trifluoromethylmercapto-o-nitrophenols, such as 5-trifluoromethylmercapto-2-nitrophenols; and N,N-dimethylsulfonamido-o-nitrophenols.

In the initial reaction of the process of this invention, the o-halobenzyl halide is reacted with an o-nitrophenol, the reaction preferably being conducted in the presence of a condensation agent, such as a base (e.g., sodium hydroxide), whereby a corresponding o-halobenzyl-o-nitrophenyl ether (Compound II) is formed. The nitro group is then reduced to an amine by treatment with a reducing agent such as nascent hydrogen, which may be formed in situ by the action of an electropositive metal on an acid, thereby forming the corresponding 2-(o-halobenzyloxy)aniline derivative (Compound III).

The aniline derivative (Compound III) is then treated with formic acid whereby the corresponding 2-(o-halobenzyloxy)formanilide derivative (Compound IV) is produced. Compound IV is then cyclized by treatment with a basic reagent (e.g., potassium carbonate and sodium carbonate) in a solvent (e.g., N,N-dimethylformamide, N,N-dimethylacetamide and nitrobenzene) at an elevated temperature, whereby the corresponding 5-formyl-5,11-dihydrodibenz[b,e] [1,4]oxazepine derivative (Compound V) is formed. The formamide is then hydrolyzed, as by treatment with a base (e.g., sodium hydroxide) at an elevated temperature to yield the 5,11-dihydrodibenz[b,e] [1,4]oxazepine derivative (Compound VI).

Compound VI is then treated with a basically substituted alkyl halide of the formula: B-A halide, wherein B and A are as hereinbefore defined, the reaction preferably being conducted in the presence of a basic condensation reagent such as sodium hydride to yield the final products of this invention (Compounds I). The same compounds can alternatively be prepared in two steps, by first reacting with an alkylene dihalide of the formula: (halide)-A-(halide) and then with a base of the formula: BH. To prepare the acid-addition salts, the resulting base is treated with the desired acid in the usual manner.

The following examples illustrate the invention (all temperatures being in centigrade). The first five examples are directed to the preparation of the 10-unsubstituted intermediates and the remaining examples are directed to the preparation of the final compounds of this invention.

EXAMPLE 1

*5,11-dihydrodibenz[b,e] [1,4]oxazepine*

(a) *Preparation of o-bromobenzyl bromide.*—A mixture of 188 g. of o-bromotoluene, 178 g. of N-bromosuccinimide, 1.5 g. of benzoyl peroxide and 350 ml. of carbon tetrachloride is stirred and refluxed for 34 hours. The reaction mixture is then cooled, filtered and concentrated on the steam bath until substantially free of solvent. After recooling, the residue is washed consecutively with a 15% aqueous solution of sodium bisulfite, water, a 15% solution of ferrous sulfate, and water. The product is dried over anhydrous magnesium sulfate and fractionated to give about 161.3 g. of o-bromobenzyl bromide, B.P. about 122–126° (10 mm.).

(b) *Preparation of o - bromobenzyl o - nitrophenyl ether.*—To a stirred solution of 119.5 g. of o-bromobenzyl bromide and 83.6 g. of o-nitrophenol in 400 ml. of 95% ethyl alcohol is added dropwise a solution of 39.6 g. of 85% potassium hydroxide in 200 ml. of water and the reaction mixture subsequently refluxed for two hours. After cooling, the product separates and is filtered, washed well with water, and air dried to give about 149.6 g. of o-bromobenzyl o-nitrophenyl ether, M.P. about 82–83°. Upon recrystallization from 95% ethyl alcohol, the product melts at about 82.5–83°.

(c) *Preparation of 2-(o-bromobenzyloxy)aniline.*—To a stirred mixture of 149.0 g. of o-bromobenzyl o-nitrophenyl ether, 270 g. of iron powder and 3.5 l. of 95% ethyl alcohol is added 25 ml. of concentrated hydrochloric acid. There is a mild exothermic reaction which is allowed to subside and heating is continued cautiously to reflux. After heating for one hour, the reaction mixture is filtered hot, concentrated until two phases appear, cooled and extracted with ether. Concentration of the dried ether extract affords about 101.1 g. of product, M.P. about 48–49°.

(d) *Preparation of 2 - (o- bromobenzyloxy)formanilide.*—To a mixture of 169.0 g. of 98–100% formic acid and 73.5 g. of acetic acid is added in small portions while cooling and stirring, 101.1 g. of 2-(o-bromobenzyloxy) aniline. The reaction mixture is then gently refluxed for 0.5 hour, concentrated to dryness in vacuo and the residue recrystallized from Skellysolve V to give about 104 g. of product, M.P. about 113.5–114°.

(e) *Preparation of 5,11-dihydrodibenz[b,e] [1,4]oxazepine-5-carboxaldehyde.*—A stirred mixture of 5.0 g. of 2-(o-bromobenzyloxy)formanilide, 2.8 g. of anhydrous potassium carbonate, 0.5 g. of copper powder, and 50 ml. of dimethylformamide is heated under nitrogen in an oil bath maintained at 155–160° for two hours. The reaction mixture is then filtered hot, concentrated to dryness, washed with water, and extracted with Skellysolve V. On cooling, the Skellysolve extract deposits about 2.6 g. of product, M.P. about 98–101°. After an additional recrystallization from hexane and three subsequent recrystallizations from Skellysolve, about 0.9 g. of pure product, M.P. about 111.5–112.5°, is obtained.

(f) *Preparation of 5,11-dihydrodibenz[b,e] [1,4]oxazepine.*—100 mg. of 5,11-dihydrodibenz[b,e] [1,4]oxazepine 5-carboxaldehyde is dissolved in a mixture of 10 ml. of ethyl alcohol and 2 ml. of 10% aqueous sodium hydroxide. The solution is refluxed for one hour, cooled, neutralized, and concentrated to dryness. Recrystallization of the residue from hexane gives feathery colorless crystals of M.P. about 118–118.5°.

EXAMPLE 2

*3-chloro-5,11-dihydrodibenz[b,e] [1,4]oxazepine*

Following the procedure of Example 1, but substituting an equivalent amount of 2-bromo-4-chlorobenzyl bromide (prepared from 2-bromo-4-chlorotoluene and N-bromosuccinimide) for the o-bromobenzyl bromide in step *b*, 3-chloro - 5,11 - dihydrodibenz[b,e] [1,4]oxazepine is obtained.

EXAMPLE 3

*3-(trifluoromethyl)-5,11-dihydrodibenz[b,e] [1,4] oxazepine*

(*a*) *Preparation of 4-(trifluoromethyl)benzyl alcohol.*—To 8.2 g. of lithium aluminum hydride in 200 ml. of dry ether is added slowly a solution of 38.0 g. of p-(trifluoromethyl)benzoic acid in 100 ml. of dry ether. Subsequently, the mixture is refluxed for one hour and carefully decomposed with 10 ml. of ethanol, followed by 100 ml. of water. The organic layer is separated, dried, concentrated and the residue distilled to give 4-(trifluoromethyl)benzyl alcohol.

(*b*) *Preparation of 2-bromo-4-(trifluoromethyl)benzyl bromide.*—To 17.6 g. of 4-(trifluoromethyl)benzyl alcohol in 100 ml. of glacial acetic acid is added 16 g. of bromine in 50 ml. of glacial acetic acid, dropwise. Subsequently, the mixture is warmed at 80° for two hours, the acetic acid is distilled in vacuo, and the residue consisting of 2-bromo-4-(trifluoromethyl)benzyl alcohol is diluted with chloroform and treated with 20.8 g. of thionyl bromide, with external cooling. Reaction is completed by a one hour reflux, following which, the reaction mixture is concentrated and the residue is distilled to give 2-bromo-4-(trifluoromethyl)benzyl bromide.

(*c*) *Preparation of 3-trifluoromethyl - 5,11 - dihydrodibenz[b,e] [1,4]oxazepine.*—Following the procedure of Example 1, but substituting an equivalent amount of 2-bromo-4-(trifluoromethyl)benzyl bromide for the o-bromobenzyl bromide in step *b*, 3-(trifluoromethyl)-5-11-dihydrodibenz[b,e] [1,4] oxazepine is obtained.

EXAMPLE 4

*7-methyl-5,11-dihydrodibenz[b,e] [1,4]oxazepine*

Following the procedure of Example 1, but substituting an equivalent amount of 2-nitro-4-methylphenol for the o-nitrophenol in step *b*, 7-methyl-5,11-dihydrodibenz[b,e] [1,4]oxazepine is obtained.

EXAMPLE 5

*3,7-dichloro-5,11-dihydrodibenz[b,e] [1,4]oxazepine*

Following the procedure of Example 1, but substituting an equivalent amount of 2-bromo-4-chlorobenzyl bromide for the o-bromobenzyl bromide and an equivalent amount of 2-nitro-4-chlorophenol for the o-nitrophenol in step *b*, 3,7-dichloro-5,11-dihydrodibenz[b,e] [1,4]oxazepine is obtained.

Similarly, if 3-bromo-4-chloromethyl-N,N-dimethylbenzenesulfonamide (prepared by the reaction of p-bromo-N,N-dimethylbenzenesulfonamide with formaldehyde and hydrochloric acid), 3-bromo-4-chloromethyl-(trifluoromethoxy)-benzene [prepared by the light catalyzed chlorination of m-bromoanisole to m-bromo-(trichloromethoxy)benzene, followed by reaction with antimony trifluoride to convert the (trichloromethoxy) group to a (trifluoromethoxy) group and treatment of the m-bromo-(trifluoromethoxy)-benzene with formaldehyde and hydrochloric acid], and 3-bromo-4-chloromethyl-(trifluoromethylmercapto)benzene [prepared by the light catalyzed chlorination of m-bromothioanisole to m-bromo-(trichloromethylmercapto)benzene, followed by reaction with antimony trifluoride to convert the (trichloromethylmercapto) group to a (trifluoromethylmercapto) group and treatment of the m-bromo-(trifluoromethylmercapto)-benzene with formaldehyde and hydrochloric acid] are substituted for the o-bromobenzyl bromide in step *b* of Example 1, there are obtained 3-(N,N-dimethylsulfonamido) - 5,11-dihydrodibenz[b,e] [1,4]oxazepine, 3-(trifluoromethoxy) - 5,11 - dihydrodibenz[b,e] [1,4]oxazepine, and 3-(trifluoromethylmercapto)-5-dihydrodibenz[b,e] [1,4]oxazepine, respectively.

Similarly, if other substituted o-bromo (or chloro)-benzyl bromides (or chlorides) are substituted for the o-bromobenzyl bromide and other substituted o-nitro phenols are substituted for the o-nitrophenol in step *b* of Example 1, and the remaining steps of the example are carried out, correspondingly substituted 5,11-dihydrodibenz[b,e] [1,4]oxazepines are prepared.

EXAMPLE 6

*5-(3-dimethylaminopropyl)-5,11-dihydrodibenz[b,e] [1,4]oxazepine*

A stirred mixture of 8.0 g. of 5,11-dihydrodibenz[b,e] [1,4]oxadezine, 2.3 g. of a 50% sodium hydride dispersion in mineral oil, and 200 ml. of dry xylene is heated under reflux for one hour and cooled. 7.3 g. of 3-dimethylaminopropyl chloride is then added dropwise and the resulting mixture is heated under reflux for five hours. The reaction mixture is then filtered, cooled and extracted with two 200 ml. portions of 5% hydrochloric acid. The combined acid extracts are made strongly basic with solid potassium carbonate and extracted with ether. After drying, the ether is removed to give about 13.3 g. of residue. Distillation gives a viscous yellow oil, B.P. about 138–143° (0.15 mm.).

EXAMPLE 7

*5-(3-dimethylaminopropyl)-5,11-dihydrodibenz[b,e] [1,4]oxazepine hydrochloride*

To 2.82 g. of distilled 5-(3-dimethylaminopropyl)-5,11-dihydrodibenz[b,e] [1,4]oxazepine in 30 ml. of dry ether is added dropwise, with ice cooling, a solution of 0.37 g. of dry hydrogen chloride in 10 ml. of dry ether. The precipitate which forms is allowed to granulate and then rapidly filtered under anhydrous conditions. The hygroscopic product is freed of solvent in vacuo to give 5-(3-dimethylaminopropyl)-5,11-dihydrodibenz[b,e] [1,4]oxazepine hydrochloride as a white crystalline product.

EXAMPLE 8

*5-(3-dimethylaminopropyl)-3-chloro-5,11-dihydrobenz-[b,e] [1,4]oxazepine*

Following the procedure of Example 6, but substituting an equivalent amount of 3-chloro-5,11-dihydrodibenz[b,e] [1,4]oxazepine for the 5,11-dihydrodibenz[b,e] [1,4]oxazepine, 5 - (3 - dimethylaminopropyl) - 3-chloro-5,11-dihydrobenz[b,e] [1,4]oxazepine is obtained.

EXAMPLE 9

*5-(3-dimethylaminopropyl)-3-(trifluoromethyl)-5,11-dihydrodibenz[b,e] [1,4]oxazepine*

Following the procedure of Example 6, but substituting an equivalent amount of 3-(trifluoromethyl)-5,11-dihydrodibenz[b,e] [1,4]oxazepine for the 5,11-dihydrodibenz[b,e] [1,4]oxazepine, 5-(3-dimethylaminopropyl)-3-(trifluoromethyl) - 5,11 - dihydrodibenz[b,e,] [1,4]oxazepine is obtained.

Similarly, 3-(trifluoromethoxy) - 5,11 - dihydrodibenz-[b,e] [1,4]oxazepine, 3-(trifluoromethylmercapto)-5,11-dihydrobibenzo[b,e] [1,4]oxazepine and 3-(N,N-dimethylsulfonamido)-5,11-dhydrodibenzo[b,e] [1,4]oxazepine yield the corresponding 5-(3-dimethylaminopropyl) derivatives.

EXAMPLE 10

*5-(3-dimethylaminopropyl)-7-methyl-5,11-dihydrobenz [b,e] [1,4]oxazepine*

Following the procedure of Example 6, but substituting an equivlaent amount of 7-methyl-5,11-dihydrodibenz[b,e] [1,4]oxazepine for the 5,11 - dihydrodibenz-[b,e] [1,4]oxazepine, 5 - (3 - dimethylaminopropyl) - 7-methyl - 5,11 - dihydrodibenz[b,e] [1,4]oxazepine is obtained.

EXAMPLE 11

*5-(3-dimethylaminopropyl)-3,7-dichloro-5,11-dihydrodibenz[b,e] [1,4]oxazepine*

Following the procedure of Example 6, but substituting an equivalent amount of 3,7-dichloro-5,11-dihydrodibenz[b,e] [1,4]oxazepine for the 5,11 - dihydrodibenz[b,e] [1,4]oxazepine, 5-(3-dimethylaminopropyl)-3,7-dichloro-5,11-dihydrodibenz[b,e] [1,4]oxazepine is obtained.

EXAMPLE 12

*5-(2-dimethylaminoethyl)-5,11-dihydrodibenz[b,e] [1,4]oxazepine*

Following the procedure of Example 6, but substituting an equivalent amount of 2-dimethylaminoethyl chloride for the 3-dimethylaminopropyl chloride, 5-(2-dimethylaminoethyl)-5,11 - dihydrodibenz[b,e] [1,4] oxazepine is obtained.

EXAMPLE 13

*5-[3-(N⁴-methylpiperazino)propyl]-5,11-dihydrodi[b,e] [1,4]oxazepine*

Following the procedure of Example 6, but substituting an equivalent amount of 3-(N⁴-methylpiperazino)propyl chloride for the 3-dimethylaminopropyl chloride, 5-[3-(N⁴-methylpiperazino)propyl]-5,11 - dihydrodibenz[b,e] [1,4]oxazepine is obtained.

EXAMPLE 14

*5-{3-[N⁴-(2-hydroxyethyl)piperazino]propyl}-5,11-dihydrodibenz[b,e,] [1,4]oxazepine*

(a) *Preparation of 5-(3-chloropropyl)-5,11-dihydrodibenz[b,e] [1,4]oxazepine.*—Following the procedure of Example 6, but substituting an equivalent amount of trimethylene chlorobromide for the 3-dimethylaminopropyl chloride, there is obtained 5-(3-chloropropyl)-5,11-dihydrodibenz[b,e] [1,4]oxazepine.

(b) *Preparation of 5-{3[N⁴-(2 - hydroxyethyl)piperazino]propyl}-5,11-dihydrodibenz[b,e] [1,4]oxazepine.*— To 4.55 g. of 5-(3-chloropropyl)-5,11-dihydrodibenz[b,e] [1,4]oxazepine in 100 ml. of methyl ethyl ketone is added 15 g. of sodium iodide and 23.2 g. of 1-(2-hydroxyethyl)-piperazine. The mixture is stirred and refluxed for eighteen hours and concentrated from the steam bath. The residue is diluted with water and extracted with ether. The ether extracts are concentrated to give 5-{3-[N⁴-(2-hydroxyethyl)piperazino]propyl} - 5,11 - dihydrodibenz[b,e] [1,4]oxazejine.

By substituting an equivalent amount of 1-(2-hydroxyethoxyethyl)piperazine or 1-(2 - acetoxyethyl)piperazine for the 1-(2-hydroxyethyl)piperazine in step b of Example 13, there is obtained 5-{3-[N⁴-(2-hydroxyethoxyethyl)piperazino]propyl}-5,11 - dihydrodibenz[b,e] [1,4]oxazepine and 5-{3-[N⁴ - (2 - acetoxyethyl)piperazino]propyl} - 5,11 - dihydrodibenz[b,e] [1,4]oxazepine, respectively.

The invention may be variously otherwise embodied within the scope of the appended claims.

What is claimed is:

1. A compound of the formula

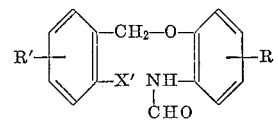

wherein X' is selected from the group consisting of bromo and chloro and R and R' are each selected from the group consisting of hydrogen, halogen, lower alkyl, lower alkoxy, trifluoromethyl, trifluoromethoxy, trifluoromethylmercapto and N,N-dimethylsulfonamido.

2. 2-(o-bromobenzyloxy)formanilide.

References Cited by the Examiner

UNITED STATES PATENTS 3,004,028   10/61   Dolliver et al. _____ 260—562

FOREIGN PATENTS 1,176,115   4/59   France.
811,857   4/59   Great Britain.

OTHER REFERENCES

Conant: The Chemistry of Organic Compounds, revised ed., page 264, N.Y., MacMillan, 1939.

Metcalf: Jour. Econ. Entol., vol. 41, pages 875–82 (1948).

WALTER A. MODANCE, *Primary Examiner.*

NICHOLAS S. RIZZO, *Examiner.*